US010155836B2

(12) United States Patent
Gupta et al.

(10) Patent No.: US 10,155,836 B2
(45) Date of Patent: Dec. 18, 2018

(54) REACTION PRODUCT OF A CYCLIC UREA AND A MULTIFUNCTIONAL ALDEHYDE

(75) Inventors: Ram B. Gupta, Stamford, CT (US); Lawrence A. Flood, Norwalk, CT (US); Urvee Y. Treasurer, Stamford, CT (US); Barry A. Lawless, Milford, CT (US); Colin Brogan, Stamford, CT (US)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 0 days.

(21) Appl. No.: 13/823,782

(22) PCT Filed: Sep. 23, 2011

(86) PCT No.: PCT/US2011/053039
§ 371 (c)(1),
(2), (4) Date: Apr. 3, 2013

(87) PCT Pub. No.: WO2012/044547
PCT Pub. Date: Apr. 5, 2012

(65) Prior Publication Data
US 2013/0203929 A1 Aug. 8, 2013

(30) Foreign Application Priority Data
Sep. 30, 2010 (EP) .................................. 10185088

(51) Int. Cl.
| | |
|---|---|
| *C08G 12/28* | (2006.01) |
| *B32B 21/02* | (2006.01) |
| *C08G 12/12* | (2006.01) |
| *C08G 12/36* | (2006.01) |
| *C08L 61/30* | (2006.01) |
| *C09D 161/24* | (2006.01) |
| *C09D 161/26* | (2006.01) |

(52) U.S. Cl.
CPC .............. *C08G 12/28* (2013.01); *B32B 21/02* (2013.01); *C08G 12/12* (2013.01); *C08G 12/36* (2013.01); *C08L 61/30* (2013.01); *C09D 161/24* (2013.01); *C09D 161/26* (2013.01)

(58) Field of Classification Search
CPC .... C08G 12/421; C08G 12/422; C08G 12/28; C08G 12/36

USPC ......................................................... 525/509
See application file for complete search history.

(56) References Cited

U.S. PATENT DOCUMENTS

| | | | |
|---|---|---|---|
| 2,881,152 A * | 4/1959 | Conn et al. .................... 427/381 |
| 4,284,758 A | 8/1981 | North |
| 4,332,586 A | 6/1982 | North |
| 4,343,655 A * | 8/1982 | Dodd et al. ................. 106/209.1 |
| 4,345,063 A | 8/1982 | North |
| 4,395,504 A | 7/1983 | Sulzberg et al. |
| 8,460,758 B2 * | 6/2013 | Flood et al. ............... 427/385.5 |
| 2002/0043086 A1 * | 4/2002 | Gabrielson ....................... 71/30 |

FOREIGN PATENT DOCUMENTS

| | | |
|---|---|---|
| CA | 1 143 888 | 3/1983 |
| JP | 56-123478 | 9/1981 |
| JP | 2006-523261 | 10/2006 |
| WO | 2004/094497 | 11/2004 |
| WO | 2009/073836 | 6/2009 |

OTHER PUBLICATIONS

International Search Report dated Nov. 25, 2011 in International (PCT) Application No. PCT/US2011/053039.
S. Mahajani et al., "Reaction of Glyoxal with Aliphatic Alcohols Using Cationic Exchange Resins as Catalysts", Organic Process Research & Development, vol. 1, 1997, pp. 97-105.
J. Kliegman et al., "Glyoxal Derivatives. V. Reaction of Alcohols with Glyoxal", J. Org. Chem., vol. 38, No. 3, 1973, pp. 556-560.

* cited by examiner

*Primary Examiner* — Michael M Dollinger
(74) *Attorney, Agent, or Firm* — Wenderoth, Lind & Ponack, L.L.P.

(57) ABSTRACT

The invention relates to a reaction product UA of at least one cyclic urea U and at least one multifunctional aldehyde A which reaction product has as substituents on the carbonyl carbon atoms of the aldehyde A at least one kind of functional groups selected from the group consisting of hydroxyl groups —OH and alkoxy groups —OR characterised in that the groups —OR comprise at least two kinds of alkoxy groups —OR$^1$ and —OR$^2$, where R$^1$ and R$^2$ are both selected from the group consisting of linear, branched or cyclic alkyl groups having from one to twelve carbon atoms, where R$^1$ and R$^2$ may be the same or may be different from each other, to a process of making these, and to a method of use as crosslinker in coating compositions.

24 Claims, No Drawings

REACTION PRODUCT OF A CYCLIC UREA AND A MULTIFUNCTIONAL ALDEHYDE

FIELD OF THE INVENTION

The present invention is directed to a reaction product of a cyclic urea and a multifunctional aldehyde, and to a process for making the same. It is also directed to a coating composition comprising the said reaction product, and to a method of use of the said coating composition to provide a coating on a substrate.

BACKGROUND OF THE INVENTION

Industrial coatings are used to protect the surface of a substrate against deterioration brought about by the action of light, humidity, wear, atmospheric oxygen, and other chemicals, and to impart the desired appearance such as colour, gloss, and surface structure. In many cases, such coatings are based on organic polymers which show good adhesion to the substrate and form a film free from defects such as pores or blisters. Film formation, also referred to as drying, is the transition of the coating composition applied to the solid state. The solid film can be formed from a solution by removal of solvent or from a dispersion by removal of the dispersing agent, or from a melt by cooling. In this case, and if no chemical reaction occurs, this is referred to as "physical drying". In the so-called chemical drying, chemical reactions occur during film formation which lead to crosslinked macromolecules. Such crosslinking may be caused by chemical reaction of low molar mass molecules, oligomers or macromolecules between themselves, such as addition or condensation reactions, or radiation induced or thermally induced polymerisation, or by the action of added polyfunctional molecules, the so-called crosslinkers, which react with functional groups of polymers usually referred to as binder resins.

A well-known class of crosslinkers used in conjunction with binder resins having active hydrogen-containing reactive groups, such as hydroxyl and carboxyl groups, are the so-called amino resins, which are hydroxy functional adducts of aldehydes, generally formaldehyde, and organic amino compounds such as triazines, particularly preferably melamine, and urea or derivatives of these, the hydroxyl groups of which are usually at least partially etherified with lower alcohols such as methanol, and n- or iso-butanol. These crosslinkers suffer from the drawback that formaldehyde, inter alia, is liberated during the curing or crosslinking reaction.

Emission of formaldehyde is environmentally undesirable. Additionally, many of these amino resins need temperatures typically of at least 80° C. to act as crosslinkers. Heating to such elevated temperatures is both time-consuming and energy-consuming In the PCT application WO2009/073836 A1, a process is disclosed for the preparation of crosslinkers based on reaction products of cyclic ureas and multifunctional aldehydes having at least two aldehyde groups which can be used in coating compositions comprising active hydrogen containing resins, such as hydroxy functional alkyd, acrylic, urethane or epoxy resins, and which coating compositions can be cured with such crosslinkers even at ambient temperature. The coatings prepared therewith showed good stability against solvents, and were not prone to yellowing. This process makes use of a multi-step reaction sequence where in the first step, the aldehyde component is mixed with an alcohol, and reacted under acidic conditions leading to formation of hemiacetals and acetals, and then in the second step, this mixture is reacted with a cyclic urea which may be preformed, or formed in situ. Depending on the reaction time, reaction conditions, and storage time in the first step, the hemiacetals and acetals may undergo oligomerisation, disproportionation and condensation reactions, leading to formation of a mixture of individual compounds such as mono- and diacetals of monomeric, dimeric or trimeric glyoxal, esters of glyoxylic acid, and glycolates. See S. Mahajani and M. M. Sharma in Organic Process Research and Development, 1997, No. 1, pages 97 to 105; and J. M. Kliegman and R. K. Barnes, J. Org. Chem., Vol. 38 (1973), No. 3, pages 556 et seq. The composition of this mixture has been found to be difficult to control.

Crosslinkers based on reaction products of cyclic ureas and glyoxal have also been described, i. a. in U.S. Pat. No. 4,284,758 A, which discloses etherified condensates of glyoxal and cyclic ureas as crosslinkers for textile fabrics. Reaction products are described therein which are made by reacting ethylene urea (2-imidazolidinone) with glyoxal, and then etherifying the adduct with methanol or other alcohols. While the non-etherified adduct had gelled already after storage for one week, the etherified adduct showed a viscosity increase of about 4.6-fold upon storage for ten weeks at 48° C. These etherified adducts were used to increase the resistance and stability of textile materials. One of the limitations of this technology as disclosed is that etherification with higher alcohols (for example butyl alcohol) results in non-homogeneity and results in formation of an emulsion mass as noted in WO 2009/073836 A1, Comparative Example 2, which is identical to example 3 of the present application. The products made according to U.S. Pat. No. 4,284,758 are characterised by a low degree of etherification, viz., less than from 50% to 60% of the theoretical value which is based on the amount of glyoxal present in the reaction.

As further noted in WO 2009/073836 A1, it has been found that although coating compositions comprising hydroxyl and carboxy functional binders can be cured with the products made according to U.S. Pat. No. 4,284,758, the appearance and performance of these coatings were not satisfactory.

It is therefore the object of this invention to provide such adducts of a cyclic urea and multifunctional aldehydes having at least two aldehyde groups per molecule that can be used as crosslinkers for coating compositions having hydroxyl and/or acid functionality, which do not have the disadvantages mentioned supra.

SUMMARY OF THE INVENTION

This object has been achieved by providing at least partially etherified reaction products UA of cyclic ureas U and multifunctional aldehydes A.

The multifunctional aldehyde A has the formula R'(—CHO)$_n$ where R' is an n-valent radical which is preferably aliphatic, —CHO being an aldehyde group, and n is an integer number of from 2 to 6, preferably 2, in which case the formula is OHC—R'—CHO where R' may be a direct bond or a divalent radical which is preferably aliphatic and may be linear, branched or cyclic and may have from one to twenty carbon atoms, both these options for R' being a direct bond or an divalent radical leading to a divalent aldehyde having exactly two —CHO groups, or R' may be an aliphatic divalent radical which may be linear, branched or cyclic and may have from one to twenty carbon atoms, and which radical carries at least one additional aldehyde group —CHO, which latter option leads to trivalent or polyvalent aldehydes having at least three aldehyde groups.

"Etherified" means here in a product of an addition reaction of an aldehyde to a cyclic urea (X being the residue of a cyclic urea which may have been reacted with a multifunctional aldehyde or may also be part of a polymer or an oligomer chain, after taking out a —CO—NH— group):

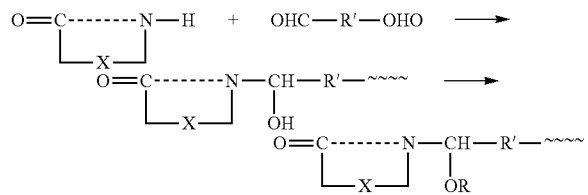

that a hydroxyl group bonded to a carbon atom that was, before the addition reaction, the carbonyl carbon atom of an aldehyde molecule (referred to as "the carbonyl C atom of an aldehyde" hereinafter, denoted by bold print "C" in the formulae supra) which is generated in the addition reaction is replaced by an alkoxy group —OR. The (growing) polymer chain is denoted by "~~~~".

"Partially etherified" means here that both —OH and —OR groups bonded to carbonyl carbon atoms of the aldehyde are present in such "partially etherified" product, which at least partially etherified reaction product has as substituents on the carbonyl carbon atoms of the aldehyde A at least one kind of functional groups selected from the group consisting of hydroxyl groups —OH and alkoxy groups —OR.

The at least partially etherified reaction product of this invention has as substituents on the carbonyl carbon atoms of the aldehyde A at least one kind of functional groups selected from the group consisting of hydroxyl groups —OH and alkoxy groups —OR characterised in that the groups —OR comprise alkoxy groups —OR$^1$ and —OR$^2$, where R$^1$ and R$^2$ are both selected independently from each other from the group consisting of linear, branched or cyclic alkyl groups having from one to twelve carbon atoms, which may be interrupted by one or more of —O—, —NR"—, —S—, where R" stands for H, or an alkyl group having from one to six carbon atoms, with the proviso that not two —O— or not two —S— atoms may be immediately adjacent, where
in a first embodiment, R$^1$ and R$^2$ are different from each other, and R$^2$ has at least one carbon atom more than R$^1$, or
in a second embodiment, R$^1$ and R$^2$ are the same, and the ratio of the number of —OR groups to the sum of the number of —OH groups and the number of —OR groups which are substituents on the carbonyl carbon atoms of the aldehyde A in the reaction product UA is more than 60%, preferably more than 65%, and especially preferred, at least 75%.

The best results were found when this ratio was greater than 80%. A higher degree of etherification corresponding to a ratio of at least 85%, and preferably, of at least 90% is also useful.

"Partially etherified" in the context of the present invention means that the ratio of the amount of substance n(—OR) of alkoxy groups generated by etherification with alcohols of hydroxyl groups which are formed by the reaction of an aldehyde group with a —CO—NH— group to the sum of the amount of substance n(—OR) of said alkoxy groups and the amount of substance n(—OH) of non-etherified said hydroxyl groups is at least 0.01 mol/mol.

In the preferred case of using ethylene urea as cyclic urea, and glyoxal as multifunctional aldehyde, —R'— is a direct bond, and —X— in the formulae supra is —NH—CH$_2$—CH$_2$—, which may be reacted with glyoxal to form a —N[CH(OH)—CHO]—CH$_2$CH$_2$— group, or may also be part of a polymer or an oligomer chain which replaces the H atom of the —NH— group.

It is yet another object of the invention to provide a combination of active hydrogen functional binder resins having reactive functional groups which carry a so-called active hydrogen group which may be selected from hydroxyl groups, acid groups, preferably carboxyl groups, carbamate groups, amide groups, imide groups, amino groups, imino groups, mercaptan groups, or phosphine groups, and a crosslinker composition comprising the at least partially etherified reaction product of a cyclic urea and a multifunctional aldehyde which combination can be cured at a temperature between ambient temperature which is 20° C., to 280° C. or more, without evolution of formaldehyde, and which leads to improved properties of the coating film prepared therefrom such as higher hardness, better chemical resistance, higher gloss and lower yellowness, and provides better stability of the catalysed coating composition.

In a still further object, a process has been provided whereby the crosslinker composition wherein in a first embodiment, R$^1$ and R$^2$ are different, can be prepared comprising the following steps:
a) mixing a multifunctional aldehyde A with a cyclic urea U to effect an addition reaction
b) adding an aliphatic alcohol R$^1$—OH, and etherifying under acid conditions
c) further etherifying under acid conditions with an added aliphatic alcohol R$^2$—OH which has at least one carbon atom in its molecule more that there is in R$^1$—OH,
wherein either or both of steps b) and c) may be repeated once or more than once.

In a still further object, a process has been provided whereby the crosslinker composition wherein in a second embodiment, R$^1$ and R$^2$ are the same, can be prepared comprising the following steps
a) mixing a multifunctional aldehyde A with a cyclic urea U to effect an addition reaction
b) adding an aliphatic alcohol R$^1$—OH, and etherifying under acid conditions
c) further etherifying under acid conditions with an added quantity of an aliphatic alcohol R$^1$—OH,
wherein either or both of steps b) and c) may be repeated once, or more than once.

DETAILED DESCRIPTION OF THE PREFERRED EMBODIMENTS

The aliphatic alcohols R—OH useful for the invention have at least one hydroxyl group, and from one to twelve carbon atoms. They can be linear, branched or cyclic, preferably linear or branched, are preferably monoalcohols and preferably have from one to twelve, preferably one to eight carbon atoms, which may be interrupted by one or more of —O—, —NR"—, —S—, where R" stands for H, or an alkyl group having from one to six carbon atoms, with the proviso that not two —O— or not two —S— atoms may be immediately adjacent. Preferred alcohols are methanol, ethanol, n- and iso-propanol, and the isomeric butanols, particularly n-butanol, and iso-butanol, n-hexanol, or 2-ethylhexanol. Other preferred alcohols are etheralcohols of the formula $R^3$—(O—$C_nH_{2n}$)$_m$—OH where $R^3$ is an alkyl group having preferably from one to four carbon atoms, n is an integer of from 2 to 4, and m is an integer of from 1 to 10, such as ethylene glycol monomethylether, ethylene glycol monobutylether, triethylene glycol monoethyl ether, or dipropyleneglycol monomethylether. Among the cyclic aliphatic alcohols, cyclohexanol is preferred. A small amount, i. e. up to a mass fraction of 10% of the aliphatic alcohols used, may be difunctional or polyfunctional (having a functionality of three or more).

At least two different such alcohols $R^1$—OH and $R^2$—OH have to be used to prepare an at least partially etherified reaction product UA of cyclic ureas U and multifunctional aldehydes A according to the first embodiment of the invention, the molar ratio $n(R^1$—OH)/$n(R^2$—OH) of these being from 1 mol/99 mol to 99 mol/1 mol, preferably from 10 mol/90 mol to 90 mol/10 mol, and particularly preferably from 25 mol/75 mol to 75 mol/25 mol. The aliphatic alcohol $R^2$—OH has at least one carbon atom in its molecule more that there is in $R^1$—OH. In a preferred embodiment, methanol is used as $R^1$OH, where $R^2$—OH may be ethanol, or a higher homologue thereof having up to twelve carbon atoms, including branched and cyclic aliphatic monoalcohols. Preferred as $R^2$—OH are ethanol, n- and iso-propanol, n-butanol, sec.-butanol, iso-butanol, n-pentanol, 2- and 3-methyl-1-butanol, n-hexanol, n-octanol, 2-ethyl-1-hexanol, 1-decanol, 1-dodecanol, and mixtures of these, as well as ether alcohols such as ethylene glycol monomethylether, ethylene glycol monobutylether, triethylene glycol monoethylether, or dipropyleneglycol monomethylether. If methanol is used as $R^1$OH, the molar ratio $n(R^1$—OH)/n($R^2$—OH) of these are especially preferably from 15 mol/85 mol to 45 mol/55 mol, preferably from 20 mol/80 mol to 40 mol/60 mol. It is further preferred that the alcohol $R^1$—OH is significantly water-miscible, meaning that mixtures of water and $R^1$—OH form homogeneous mixed phases. It is further preferred that the alcohol $R^2$—OH has at most limited solubility in water, limited solubility meaning that the aqueous phase does not contain a mass fraction of more than 30% of the alcohol $R^2$—OH. In this embodiment wherein $R^1$ and $R^2$ are different from each other, $R^2$ has at least one carbon atom more than $R^1$, and the ratio of the number of —OR groups to the sum of the number of —OH groups and the number of —OR groups which are substituents on the carbonyl carbon atoms of the aldehyde A in the reaction product UA is at least 50%, preferably more than 60%, particularly preferably more than 65%, and especially preferred, at least 75%, the number of —OR groups being the sum of the number of —$OR^1$ groups and the number of —$OR^2$ groups.

When a "carbonyl C atom of the multifunctional aldehyde" is mentioned, this includes also the same carbonyl atom which after the addition reaction with the amidic group in the cyclic urea is transformed to a carbon atom linked to a nitrogen atom, and having an —OH or —OR substituent, depending on whether or not etherification has been made.

It is further preferred that the degree of etherification of the reaction product UA, measured as the ratio n(RO—)/n (U) of the amount of substance n(RO—) of alkoxy groups to the amount of substance n(U) of cyclic urea U chemically bound in the reaction products, is at least 1.1 mol/mol, as measured by $^{13}$C-NMR as detailed infra.

It is further preferred that the reaction product UA has a ratio of the amount of substance of residual >NH groups to the amount of substance of moieties derived from the cyclic urea U of not more than 0.2 mol/mol.

The multifunctional aldehydes A have at least two aldehyde groups, obeying the formula OHC—R'—CHO in the case of a difunctional aldehyde, and are preferably aliphatic in nature. R' is in this case a direct bond or a divalent aliphatic radical having from one to ten carbon atoms. "Multifunctional" is used to denote, in the context of this invention, a molecule having more than one functional group. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal. Glyoxal may be used for this invention in aqueous solution, as anhydrous solid which has to be cooled as its melting temperature is 15° C., or in the for of its dimer or trimer, optionally in solid hydrated form as dihydrates, or in the form of its addition products with sulphites or hydrogen sulphites which decompose under acidic conditions.

The cyclic ureas U which may be used according to the present invention have at least one unsubstituted —CO—NH— group. These cyclic ureas U are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. These cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the at least one cyclic urea U is selected from the group U1 consisting of ethylene urea, 1,2 propylene urea, hydantoin also known as glycolyl urea, parabanic acid also known as oxalyl urea, and glycoluril, and from the group U2 consisting of the cyclic ureas U1 which additionally have at least one substituent $R^3$ on at least one of the nitrogen or carbon atoms of the said cyclic ureas U1, with the proviso that at least one nitrogen atom is unsubstituted, and the substituent $R^3$ is selected from the group consisting of linear, branched and cyclic alkyl groups having from 1 to 10 carbon atoms.

A particularly preferred combination is glyoxal reacted with ethylene urea, and optionally, either glyoxal, or ethylene urea, or both, in mixture with other multifunctional aldehydes and/or other cyclic ureas.

It has been found that when using purified cyclic ureas instead of commercially available qualities, e. g. commercial ethylene urea which has about 96% purity (the mass fraction of ethylene urea in one commercially available product is (96.0±0.5)%), both colour and stability of the reaction product with multifunctional aldehydes are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality.

In the process according to the invention, the following additional preferred measures may be realised, singly, or in any combination:
the multifunctional aldehyde A is charged first,
the cyclic urea U is charged first, water may be added to the multifunctional aldehyde A, or to the cyclic urea U, or to their mixture the pH of the mixture of the multifunctional aldehyde A and the cyclic urea U may be adjusted to from 5.0 to 8.0, preferably from 5.5 to 7.5, and particularly preferably, from 6.2 to 6.8, the mixture of the cyclic urea U and the multifunctional aldehyde may be heated to from ambient to less than 80° C., preferably, to between 35° C. and 50° C., the mass of cyclic urea U and the mass of aldehyde A present in the reaction mixture are preferably chosen such that the following condition is met for ratio of the amount of substance n (—CHO) of aldehyde groups in the multifunctional aldehyde, and, in the case of mixtures of aldehydes, and the amount of substance of —CO—NH— groups in the cyclic urea U:

$$0.8 \text{ mol/mol} \leq n(\text{-CHO})/n(\text{-CO—NH—}) \leq 1.40 \text{ mol/mol}$$

and particularly preferably, $$1.0 \text{ mol/mol} \leq n(\text{-CHO})/n(\text{-CO—NH—}) \leq 1.30 \text{ mol/mol},$$

the aliphatic alcohol $R^1$—OH is added preferably in an amount such that the ratio of the amount of substance of alcohol $R^1$—OH, $n(R^1$—OH) to the amount of substance of aldehyde groups in the multifunctional aldehyde A is from 0.6 mol/mol to 20 mol/mol, a second alcohol $R^2$—OH is added after an etherification stage where alcohol $R^1$—OH has been used, the pH during the etherification or alkylation reaction is preferably below 5, particularly preferably to below 3.0, etherification is preferably effected between 25° C. and 100° C., most preferably, between 40° C. and 45° C., water formed during etherification, and the unreacted alcohol are removed during or after the etherification, preferably by distillation under reduced pressure, and further preferably, at a temperature between 50° C. and 80° C.

if water and alcohol are removed during etherification, the alcohol is preferably recycled after etherification reaction and optional removal of unreacted alcohol and of water, the reaction mixture is preferably cooled to obtain a solution of an at least partially etherified reaction product of an aliphatic multifunctional aldehyde A and a cyclic urea U, after an etherification step, the reaction mixture is neutralised, the unreacted alcohol is stripped from the neutralised reaction mixture, and the remaining material is subjected to a further etherification step, and the ratio of the amount of substance n (—O—$R^2$) of alkoxy groups —O—$R^2$ to the amount of substance n (—O—$R^1$) of alkoxy groups —O—$R^1$ in the etherified product of this process is between 0.11 mol/mol and 20 mol/mol.

Particularly good results have been obtained when combining two or more of these preferred embodiments.

If a process is used whereby the crosslinker composition is prepared using the following steps:

a) mixing a multifunctional aldehyde A with a cyclic urea U to effect an addition reaction b) adding an aliphatic alcohol $R^1$—OH, and etherifying under acid conditions c) adding a further aliphatic alcohol $R^2$—OH which has at least one carbon atom in its molecule more that there is in $R^1$—OH, and etherifying under acid conditions, wherein either or both of steps b) and c) may be repeated once or more than once, it is further preferred that the ratio of the amount of substance n (—O—$R^2$) of alkoxy groups —O—$R^2$ to the amount of substance n (—O—$R^1$) of alkoxy groups —O—$R^1$ in the etherified product of this process is between 0.11 mol/mol and 20 mol/mol.

If a solid precipitate or a suspended solid is formed during the reaction, this solid matter is preferably separated by any of the usual processes such as centrifugation, or filtration.

A preferred process to make the reaction product UA wherein R' and $R^2$ are different comprises the following steps a) mixing a multifunctional aldehyde A with a cyclic urea U to effect an addition reaction, optionally, in the presence of a co-solvent which does not react with any of the multifunctional aldehyde A, the cyclic urea U, and the reaction product UA, and further optionally, removing water, b) adding an aliphatic alcohol $R^1$—OH, and etherifying under acid conditions c) adding a further aliphatic alcohol $R^2$—OH which has at least one carbon atom in its molecule more than there is in $R^1$—OH, and etherifying under acid conditions, wherein either or both of steps b) and c) may be repeated one or more times.

A further preferred process to make the reaction product UA wherein R' and $R^2$ are the same comprises the following steps a) mixing a multifunctional aldehyde A with a cyclic urea U to effect an addition reaction, optionally, in the presence of a co-solvent which does not react with any of the multifunctional aldehyde A, the cyclic urea U, and the reaction product UA, and further optionally, removing water, b) adding an aliphatic alcohol $R^1$—OH, and etherifying under acid conditions c) adding a further quantity of the aliphatic alcohol $R^1$—OH and etherifying under acid conditions, where step c) may be done once, or may be repeated to be done at least twice.

Repetition of an etherification step in any of these processes, i. e. addition of alcohol and further etherification after optional removal of water and unreacted alcohol, has been found to increase the degree of etherification. This repetition is particularly preferable in the case of only one alcohol being used for etherification. Double or triple or multiple etherification, the number of repetitions being selected to reach the desired degree of etherification, is therefore a preferred method. These repeated etherification steps may be done by simply adding further alcohol, and optionally, further acid catalyst, to the reaction mixture, and continuing the reaction, or the reaction mixture after one etherification step may be cooled, neutralised, the unreacted alcohol, and optionally water, be removed, and then, further alcohol and acid catalyst may be added for the following etherification step.

In a preferred variant, after an etherification step, at least a part of the unreacted alcohol and optionally, at least a part of the water present, and further optionally, at least a part of the at least one solvent that has no reactive groups which react with aldehyde groups, —CO—NH— groups, or hydroxyl groups, is removed by azeotropic distillation wherein a solvent is added that is immiscible with water in a way that it forms a phase separate from an aqueous phase containing at least a part of the water separated by distillation, wherein the phase different from the aqueous phase is recycled to the distillation still, or back to the reactor.

It has also been found that higher molar mass reaction products UA can be made by a process variant, where in step a), the amount of multifunctional aldehyde A added is less than 90% of the stoichiometric amount needed, preferably between 20% and 80% of the stoichiometric amount needed, and particularly preferably, between 30% and 70% of the stoichiometric amount needed, and that after step a), a further quantity of multifunctional aldehyde A is added and reacted with the reaction mixture formed in step a) wherein the total amount of multifunctional aldehyde A added is chosen such that the ratio of the amount of substance of aldehyde groups n(-CHO) in the multifunctional aldehyde A and the amount of substance of groups n(-CO—NH) in the cyclic urea U is from 0.8 mol/mol to 1.40 mol/mol, particularly preferably from 1.0 mol/mol to 1.30 mol/mol.

In a preferred variant, the mixture of cyclic urea U, multifunctional aldehyde A, and optionally, water or solvent, is concentrated before or during the reaction by removing volatile constituents by distillation, or distillation under reduced pressure.

In a still further preferred variant, during or after step a) and/or during or after step b), at least a part of the unreacted alcohol $R^1OH$ and/or water is removed by distillation.

It has further been found that the reaction between the cyclic urea U and the multifunctional aliphatic aldehyde A can preferably be conducted in the presence of a solvent which does not react with either of the cyclic urea U, the multifunctional aliphatic aldehyde A, and the reaction product UA of these. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

The reaction products thus obtained can be combined as crosslinker composition both with solvent borne and with water borne binder resins having active hydrogen functionality (preferably hydroxyl or carboxylic acid groups). When methanol or ethanol, alone or in combination, are used as etherifying alcohol, the resulting crosslinker compositions are particularly useful in combination with water-borne crosslinkable resins. Use of higher alcohols such as propanol or butanol makes the crosslinker composition more compatible with solvent-borne crosslinkable resins. It was found that the crosslinker compositions prepared according to the invention have a higher reactivity and can be used for curing even at room temperature, and that the appearance of the cured films is also favourable for the crosslinkers according to the present invention, in yellowness and gloss and haziness.

Coating compositions are prepared by admixing the reaction product UA to a polymeric binder resin having active hydrogen atoms, i. e. at least one of hydroxyl groups, acid groups, preferably carboxyl groups, carbamate groups, amide groups, imide groups, amino groups, imino groups, mercaptan groups, or phosphine groups. The resulting mixture is homogenised, and applied to a substrate by spraying, brushing, wire coating, curtain coating, blade coating, roll coating, dipping, electrophoretic deposition, powder spraying, or electrostatic spraying.

The ratio of mass of solid binder resin to the mass of the reaction products UA is preferably from 99/1 to 50/50, particularly preferably from 95/5 to 60/40, and most preferred, from 90/10 to 70/30.

It has been verified that the crosslinker compositions according to the invention can be combined with solvent borne or water borne binder resins having active hydrogen atoms (these resins collectively also referred to hereinafter as "active hydrogen material") which are preferably hydrogen atoms in hydroxy or carboxylic acid functionality, or both, particularly with hydroxy or carboxylic acid functional alkyd resin, hydroxy or carboxylic acid functional acrylic resins, hydroxy functional polyurethane resins, and hydroxy functional epoxy resins, to generate a curable composition which can be used as constituent for a coating composition. As these crosslinker compositions are active already at ambient temperature (20° C. to 25° C.) when appropriately catalysed, they are particularly useful to cure coatings on heat sensitive substrates, such as paper, cardboard, textiles, leather, wood, fabricated wood, and also plastics, including composite materials, thermosets, and thermoplastics. They also work, of course, as crosslinkers for coating compositions that are used on substrates such as metals, stone, plaster, glass, ceramics, and concrete which allow higher curing temperatures. Application of said crosslinker composition in combination with the binder resins mentioned supra, and optionally, also catalysts, can also be considered where cure temperature or energy savings are an issue. Usual additives such as organic solvents, coalescing agents, defoamers, levelling agents, fillers, light stabilisers, pigments, flow control agents, antiskinning agents, antisettling agents, wetting agents, preservatives, plasticisers, mould release agents, and corrosion inhibitors can, of course, be used in coating compositions comprising the crosslinker compositions of the present invention.

Suitable catalysts are preferably acid catalysts, particularly those selected from the group consisting of organic sulphonic acids, organic phosphonic acids, organic sulphonimides, and Lewis acids, or salts or complexes of Lewis acids such as amine salts or ether complexes. Useful catalysts are para-toluene sulphonic acid (pTSA), dodecylbenzene sulphonic (DDBSA), dinonylnaphthalene sulphonic acid (DNNSA), and dinonyl naphthalene disulphonic acid (DNNDSA), which may also be blocked with volatile amines. Particularly preferred are N-methylsulphonyl-p-toluenesulphonamide (MTSI), para-toluene sulphonic acid (pTSA), dodecylbenzene sulphonic (DDBSA), dinonylnaphthalene sulphonic acid (DNNSA), and dinonyl naphthalene disulphonic acid (DNNDSA). Blocked acid catalysts where the acid is liberated e. g. by heating can, of course, also be used, such as acid esters or reaction products of acids and epoxide functional compounds. Particularly useful catalysts are acid catalysts, such as toluene sulphonic acid, or dinonyl naphthalene disulphonic acid, which are usually dissolved in alcohol.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxyfunctional resins include CRYLCOAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith.

The coating compositions can be applied by any of the known techniques such as spraying, dipping, brushing, wire coating, curtain coating, and using a doctor blade. If formulated as solids, they may also be used as crosslinkers in powder coating compositions, and may be applied by the usual methods such as electrostatic spraying, or powder spraying.

The coating composition or curable composition may also contain, as an optional ingredient, a medium such as a liquid medium to aid the uniform application and transport of the curable composition. Any or all of the ingredients of the curable composition may be contacted with the liquid medium. Particularly preferred is a liquid medium which is a solvent for at least one of the ingredients of the curable composition. Suitable solvents include aromatic hydrocarbons, aliphatic hydrocarbons, halogenated hydrocarbons, ketones, esters, ethers, amides, alcohols, water, compounds having a plurality of functional groups such as those having an ether and an ester group, and mixtures thereof.

The present curable compositions may employ a liquid medium such as a solvent, or it may employ solid ingredients as in powder coatings, which typically contain no liquids. Contacting with the substrate also referred to as "coating" may be carried out by dipping, spraying, padding, brushing, roller coating, flow coating, curtain coating, electro coating or electrostatic spraying.

The liquid or powder coating compositions and a substrate to be coated are contacted by applying the curable composition onto the substrate by a suitable method, for example, by spraying in the case of the liquid compositions and by electrostatic spraying in the case of the powder compositions. In the case of powder coatings, the substrate covered with the powder composition is heated to at least the fusion temperature of the curable composition forcing it to melt and flow out and form a uniform coating on the substrate. It is thereafter fully cured by further application of heat, typically at a temperature in the range of about 120° C. to about 240° C. for a period of time in the in the range of about five minutes to about thirty minutes and preferably for a period of time in the range of ten minutes to twenty minutes.

In the case of the liquid compositions, the solvent is allowed to at least partially evaporate to produce a uniform coating on the substrate. Thereafter, the coated substrate is allowed to cure at temperatures of about 20° C. to about 240° C., or about 25° C. to about 150° C. for a period of time in the range of about twenty seconds to about thirty days depending on the temperature used to obtain a cured film. In a particularly advantageous embodiment, curable compositions of the present invention can be heat cured at lower temperatures preferably ranging from about 20° C. to about 150° C. or about 65° C. to about 110° C.

Another embodiment of this invention is a waterborne curable composition comprising a curable composition as described above, and water. The waterborne curable composition may permit formation of a dispersion, emulsion, invert emulsion, or solution of the ingredients of the curable composition. The waterborne curable composition may optionally contain a surfactant, an emulsifying agent, a dispersant or mixtures thereof.

The mass fraction of total solids present in the waterborne curable composition is usually from about 1% to about 60%, preferably from about 10% to about 55%, and more preferred, from about 25% to about 50%, based on the total mass of the composition.

The mass ratio of active hydrogen-containing material to crosslinker UA present in the waterborne curable composition is usually from about 99:1 to about 1:1, preferably from 95:5 to about 60:40, and more preferred, from about 90:10 to about 70:30.

The ratio of the mass of surfactant present in the waterborne curable composition to the mass of the total active hydrogen-containing material in the composition is usually from about 0% to about 10%, preferably from about 0.1% to about 5%, and more preferred, from about 0.5% to about 2.0%.

The solvent components in the waterborne curable composition are solvents such as water and an optional co-solvent. Examples of such optional co-solvents are solvents mentioned hereinabove, to the extent that they are water-soluble or water-miscible in the amount used. Preferred co-solvents for the waterborne composition are alcohols and glycol ethers. The amount of co-solvent that may be preferably used is expressed as the ratio of the mass of co-solvent to the sum of the masses of the active hydrogen-containing material and of the crosslinker UA in the waterborne curable composition of from 0% to about 30%, more preferably, from about 2% to about 25%, and particularly preferred, from about 5% to about 15%.

Surfactants, emulsifying agents and/or dispersants are molecules which have a hydrophobic portion (A) and a hydrophilic portion (B). They may have any of the molecular structure A-B, A-B-A, B-A-B, etc, where a hyphen indicates a chemical bond between a moiety A and a moiety B. Typically, the hydrophobic moiety can be an alkyl or an alkaryl residue, a poly(propylene-oxy) block, a polydimethylsiloxane block or a fluorocarbon block. The hydrophilic moiety of a non-ionic surfactant is a water soluble non-ionic block, typically a poly(ethylene-oxy) block or a hydroxylated polymer block. The hydrophilic moiety of an anionic surfactant is typically an acid group converted to an anionic group by addition of a base. Typical acid groups are carboxylic acids, sulphonic acids, phosphonic acids and phosphoric acids which form carboxylate ions, sulphonate ions, phosphonate ions and phosphate ions. Typical bases used to ionise the acids are NaOH, KOH, $NH_4OH$ and a variety of tertiary amines, such as triethyl amine, triisopropyl amine, dimethyl ethanol amine, methyl diethanol amine and the like.

The anionic surfactants that may be used include, for example, salts of fatty acids, sulphuric acid esters or sulphonates of higher alcohols preferably having from eight to eighteen carbon atoms and alkali metal salts thereof, alkylbenzene sulphonates, alkyl naphthalene sulphonates, a condensation product of naphthalene sulphonic acid and formalin, dialkyl sulphone succinates, alkyl phosphates, and poly (oxyethylene) sulphates. Particularly preferred are, for example, fatty acid salts such as potassium oleate, and a higher alcohol sulphuric acid ester salt such as sodium lauryl sulfate.

The cationic surfactants include, for example, alkylamine salts, quaternary ammonium salts, and poly(oxyethylene) alkylamines. Particularly preferred are quaternary ammonium salts such as lauryl trimethyl ammonium chloride or cetyltrimethyl ammonium chloride.

Amphoteric surfactants include alkylbetaines such as laurylbetaine and stearylbetaine.

The non-ionic surfactants include, for example, poly(oxyethylene)alkyl ethers, poly(oxyethylene)alkylphenol ether, fatty acid esters of sugar alcohols or derivatives thereof such as sorbitan (mixture of dehydration products of sorbitol), poly(oxyethylene)sorbitan fatty acid ester such as poly(oxyethylene)sorbitan monolaurate or monostearate, a polyoxyethylene acryl ester, an (oxyethylene-oxypropylene) block copolymer and a fatty acid monoglyceride.

Particularly preferred active hydrogen containing-materials useful for waterborne curable compositions are hydroxyfunctional acrylic resins having an acid number of between 3 mg/g and 20 mg/g and a hydroxyl number of between 20 mg/g and 80 mg/g, and a mass fraction of solids of between 40% and 55%, such as Roshield® 1024.

The curable compositions of this invention may be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics including thermoplastics and thermosets, wood, ceramics and glass. They can also be used in electronic applications, including coatings for metallised circuit boards, semiconductor surfaces, displays, and packaging for electronic circuitry.

The curable compositions of the present invention are particularly well suited to coat heat sensitive substrates such as plastics and wood which may be altered or destroyed entirely at the elevated cure temperatures prevalent in the heat curable compositions of the prior art.

A further method of use of the reaction product UA is as crosslinker for substrates selected from the group consisting of paper, textiles, wood, fabricated wood, leather, or cellulosic materials, which method comprises mixing at least one of catalysts, fillers, wetting agents, solvents, and diluents, to the reaction product UA to form a crosslinker composition, and applying the crosslinker composition to the substrate. Application may preferably be done by soaking, dipping, immersing, brushing, or rolling.

Still further preferred embodiments are described in the claims.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

EXAMPLES

The following examples illustrate the invention, without intending to limit. All concentrations (strengths) and ratios stated in "%" are mass fractions (ratio of the mass $m_B$ of a specific substance B, divided by the mass m of the mixture, in the case of a concentration, or by the mass $m_D$ of the second substance D, in the case of a ratio). The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol".

$^{13}$C-NMR analyses have been done with a Bruker-Oxford Avance II 400 NMR spectrometer with a 100 mm probe. Samples were prepared by diluting the reaction products with approximately the same mass of dimethyl sulphoxide-$d_6$.

Measurement of molar mass of the reaction products UA was done by HPSEC, or gel permeation chromatography, using tetrahydrofuran as solvent, at a sample concentration of 1 g/100 ml, a flow of 1.0 ml/min, a column temperature of 40° C., and refractometric detection, using a set of crosslinked polystyrene bead filled columns having a particle diameter of 5 im, with pore sizes of 100 nm (1×), 50 nm (2×), and 10 nm (3×), providing a measuring range of from 100 g/mol to 50 kg/mol, for calibration with polystyrene standards. Data collection and analysis was made with a software provided by Polymer Standards Service WinGPC system.

Example 1

Mixed Methyl and Butyl Ether of 2-Imidazolidinone-Ethanedial Resin

A resin according to the invention was prepared by the following procedure:

363 g (2.6 mol) of an aqueous solution of glyoxal (ethane dial, with a mass fraction of solute of 40%) were charged to a reaction vessel under a nitrogen purge and the pH was adjusted to 6.2 by addition of aqueous sodium bicarbonate solution with a mass fraction of solids of 10%. 207 g (2.18 mol) of ethylene urea (2-imidazolidinone hemihydrate, solid) were added and the resulting mixture was heated to a temperature of between 40° C. and 45° C. and held for three hours under stirring. At the end of three hours, 464 g (14.5 mol) of methanol were added. The pH was adjusted to about 2.5 with aqueous sulphuric acid (with a mass fraction of solute of 25%) and the reaction temperature was then raised and maintained at (48±3)° C. for three hours. At the end of three hours of methylation, 998 g (13.5 mol) of 1-butanol were added and pH was readjusted to about 2.5 with aqueous sulphuric acid as supra. The reaction temperature was again maintained at (48±3)° C. for one hour and then, excess methanol and butanol were removed slowly under reduced pressure (25.333 kPa slowly linearly decreased to 16 kPa, equivalent to 190 mm Hg ramped to 120 mm Hg) until a mass fraction of approximately from 36% to 40% of the total reaction mass had been removed. The remaining reaction mixture was then cooled to approximately 35° C. and the pH of the reaction mixture was then adjusted to approximately 6.5 with aqueous sodium hydroxide solution having a mass fraction of solids of 25%. The reaction temperature was then raised to (55±5)° C. and removal of excess methanol and butanol was continued under reduced pressure (16 kPa slowly linearly decreased to 6.7 kPa, equivalent to 120 mm Hg ramped to 50 mm Hg) until a dynamic viscosity of approximately 300 mPa·s and a mass fraction of solids of 63% were obtained. The resulting product solution was filtered.

The degree of etherification of the resulting straw yellow crosslinker solution (814 g) was determined by $^{13}$C-NMR analysis as n(—O-Alkyl)/n(EU)=1.92 mol/mol; "EU" stands for ethylene urea, its molar mass was determined by HPSEC as $M_w$=1553 g/mol, where $M_w$ stands for the weight average molar mass. The fraction of the area in the graph of refraction number difference versus elution volume commonly provided in a high performance size exclusion analysis, which is also referred to as gel permeation chromatography, of the low molar mass range, viz., below a molar mass of 1 kg/mol, was 34.1%. The Hazen Colour (determined in accordance with DIN-ISO 6271) was 383. The ratio of the amount of substance n(—O-Bu) of n-butoxy groups to the amount of substance n(—O-Me) of methoxy groups in the reaction products was 2.7 mol/mol.

This mixed ether product when evaluated in ambient and heat cured surface coating applications resulted in coating films with good appearance and satisfactory resistance properties comparable to formulations using amino-formaldehyde resins as crosslinkers. Its formulation stability was found to be at least on par with commercial amino resin crosslinker formulations.

Example 2

Ethyl ether of 2-Imidazolidinone-Ethanedial Resin, made according to U.S. Pat. No. 4,284,758 (Example 4)

A resin according to Example 4 of U.S. Pat. No. 4,284,758 was prepared by the following procedure:

290 g (2 mol) of a 40% strength aqueous glyoxal solution were charged to a 1 L reactor and the pH was adjusted to 6.3 with 1.1 g (0.013 mol) of solid sodium bicarbonate. 176 g (2 mol) of ethyleneurea were added, the pH was adjusted to 6.4 with 25% strength aqueous sulphuric acid, and the reaction temperature was raised to (55±5)° C. After 2 hours the reaction mixture was cooled to 40° C., and 288 g (6.25 mol) of ethanol were added. pH of the mixture was adjusted to about 3.0 by adding 1.0 g (0.010 mol) of concentrated sulphuric acid. The reaction temperature was then raised and held at reflux for 3 hours to effect ethylation. Upon cooling to from 29° C. to 30° C., the pH of the resin solution was adjusted to about 7.1 with 3.2 g (0.20 mol) of a 25% strength aqueous solution of sodium hydroxide.

The filtered product was a dark yellow solution (approximately 745 g) having a Gardner-Holt viscosity of A-B equal to 60 mPa·s, and a mass fraction of solids of approximately 45%. Its degree of etherification and molar mass of the crosslinker product were determined by $^{13}$C-NMR and by HPSEC analyses as n(—O-Alkyl)/n(EU)=1.00 mol/mol, and 1840 g/mol, respectively. Hazen APHA colour value of the crosslinker product determined in accordance with DIN ISO 6271 was 468.

Example 3

Butyl Ether of 2-Imidazolidinone-Ethanedial Resin made according to U.S. Pat. No. 4,284,758 (Example 4)

A resin according to Example 4 of U.S. Pat. No. 4,284,758 was prepared by the following procedure:

290 g (2 mol) of an aqueous of glyoxal solution with a mass fraction of solids of 40% were charged to a 1 L reactor and the pH was adjusted to 6.3 by addition of 0.69 g (8 mmol) of solid sodium bicarbonate. 176 g (2 mol) of ethyleneurea were added, the pH was adjusted to 6.5 by addition of 25% strength aqueous solution of sulphuric acid, and the reaction temperature was raised to (55±5)° C. After two hours, the reaction mixture was cooled to 38° C., and 462 g (6.23 mol) of 1-butanol were added. A non-homogeneous reaction mixture with opaque viscous resin mass formed. The pH of the mixture was adjusted to 3.0 by addition of 0.65 g (6.5 mmol) of concentrated sulphuric acid. The reaction temperature was then raised and held at reflux for three hours to effect butylation. Upon cooling to 30° C., the pH of the resin solution was adjusted to about 7.0 by addition of 2.0 g (10.2 mmol) of a 25% strength aqueous solution of sodium hydroxide. The resulting product solution was filtered.

The product was a dark yellow emulsion (ca. 900 g) having a Gardner-Holt viscosity of F which is equivalent to 140 mPa·s, and a calculated mass fraction of solids of 40%.

The degree of etherification of the resin in the resulting yellow emulsion was determined by $^{13}$C-NMR as n(—O-Alkyl)/n(EU)=0.95 mol/mol, and its molar mass was determined by HPSEC as $M_w$=4300 g/mol.

This product when evaluated in surface coating applications resulted in films with poor appearance and low gloss and unsatisfactory resistance properties. This experiment indicates that the process is not suited for etherification with higher alcohols.

Example 4

Preparation of Coating Compositions

Coating compositions were prepared by using the ingredients listed in table 1 below. The short oil alkyd resin based on coconut oil (Beckosol® 12035, Reichhold Industries, Inc.) was charged to a vessel, fitted with a suitable mixing device, followed by addition of the solvent and requisite level of catalyst ("pTSA" para-toluene sulphonic acid, dissolved in isopropanol, or alternatively "DNNDSA", dinonyl naphthalene disulphonic acid, dissolved in isobutanol). The crosslinkers from Examples 1 and 3, respectively, were added along with additional solvent as needed and stirred to provide coating formulations with a mass fraction of solids of 45% and an overall mass ratio of binder to crosslinker of 70/30.

TABLE 1

| Coating Compositions | | |
| --- | --- | --- |
| coating formulation | 4.1 | 4.3 |
| crosslinker of example | 1 | 3 |

TABLE 1-continued

| Coating Compositions | | |
|---|---|---|
| mass of crosslinker in g | 21.4 | 33.8 |
| mass of binder resin[1] in g | 52.5 | 52.5 |
| methoxy propanol in g | 0.9 | 0 |
| pTSA[2] in g | 2.25 | 4.5 |
| ethanol in g | 22.9 | 0 |
| 1-butanol in g | 0 | 9.2 |

[1] short oil alkyd based on coconut oil, acid number 12 mg/g, hydroxyl number 155 mg/g, 60% strength solution in xylene (Beckosol ® 12-035, Reichhold Chemicals)
[2] solution of para-toluene sulphonic acid, 40% strength in isopropanol Films were prepared by applying the coating composition of Examples 4.1 and 4.3 to the surface of 101.6 mm×152 4 mm (4"×6") clean glass panels and white Leneta cards and using a wire-wound coating bar #65 to draw down the applied formulation resulting in a uniform film. The coated panels were then allowed to flash at room temperature for either twenty-four hours at ambient conditions (20° C. to 25° C.), or for five minutes at 65° C., and film properties measured twenty-four hours later. Film appearance was judged visually, where coating films denoted with "poor" had irregular surface, and coating film denoted with "good" had smooth transparent surface and no wrinkles. Film hardness was measured using BYK Gardner Pendulum Hardness Tester—König hardness (measured according to ASTM D 4366, equivalent to DIN EN ISO 1522). The results summarised in table 2 were obtained upon ambient temperature cure (23° C.):

TABLE 2

| Coating Performance | | |
|---|---|---|
| coating formulation | 4.1 | 4.3 |
| film appearance | good | poor |
| Hardness according to König | 101 s | 38 s |

Example 5

Mixed Methyl and Butyl Ether of 2-Imidazolidinone-Ethanedial Resin 72.5 g (0.5 mol) of an aqueous solution of glyoxal (ethane dial, with a mass fraction of solute of 40%) were charged to a reaction vessel under a nitrogen purge and the pH was adjusted to 6.2 by addition of aqueous sodium bicarbonate solution with a mass fraction of solids of 10%. 48 g (0.5 mol) of ethylene urea hemihydrate (2-imidazolidinone hemihydrate, solid) were added and the resulting mixture was heated to a temperature of between 40° C. and 45° C. and held for three hours under stirring and further held overnight at ambient. 370 g (5.0 mol) of n-butanol were then added. The reaction mass turned into a non-homogeneous sticky resinous mass and adhered to the walls of the flask and agitator. The mixture was acidified to a pH below 3.0 by adding 0.2 g of concentrated sulphuric acid and heated to 50° C. for two hours without any dissolution of the resinous mass. At this point 220 g (6.8 mol) methanol were charged to the reactor and pH adjusted to from 2.5 to 2.8 by addition of 0.25 g of concentrated sulphuric acid. The mixture was heated to 50° C. upon which the resinous mass slowly dissolved within two hours. The pH of the reaction mixture was then adjusted to 6.7 by addition of an aqueous solution of sodium hydroxide with a mass fraction of solids of 25%. The reaction temperature was then raised to (55±5)° C. for the removal of excess methanol and butanol under reduced pressure (16 kPa slowly linearly decreased to 6.7 kPa, equivalent to 120 mm Hg ramped to 50 mm Hg) until a mass fraction of solids of 70% was obtained. The resulting product solution was filtered.

The degree of etherification of the resulting yellow crosslinker solution (106 g) was determined by $^{13}C$-NMR as n(—O-Alkyl)/n(EU)=1.68 mol/mol, and its molar mass was determined by HPSEC as $M_w$=1820 g/mol. The ratio of the amount of substance of n-butoxy groups to the amount of substance of methoxy groups in the reaction products was 0.22 mol/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

While the product of Example 5 is a mixed ether resin obtained by stepwise addition of alcohols for etherification, it has the issues of non-homogeneity as noted in the example. The following Example 6 demonstrates that stepwise etherification using methanol as the first alkylating alcohol followed by etherification with a higher alcohol alleviates the formation of a non-homogeneous sticky resinous mass.

Example 6

Mixed Methyl and Butyl Ether of 2-Imidazolidinone-Ethanedial Resin

The procedure of Example 1 was repeated by reacting 1.2 mol of glyoxal with 1 mol of ethylene urea hemihydrate purified by recrystallisation, and alkylating using methanol as the first alcohol and n-butanol as the second alcohol. The resulting product solution was filtered. The product was a clear viscous resin with a mass fraction of solids of about 62%. Its Hazen APHA colour was 128, notably lower than for the crosslinker made from non-purified ethylene urea (example 1), although the colour of the ethylene urea itself was not visibly improved by the recrystallisation step.

The degree of etherification was determined by $^{13}C$-NMR as n(—O-Alkyl)/n(EU)=2.23 mol/mol, and the molar mass was determined by HPSEC as $M_w$=2500 g/mol. The ratio of the amount of substance of n-butoxy groups to the amount of substance of methoxy groups in the reaction products was 19.3 mol/mol. As with product of Example 1, this mixed ether product of example 6 when evaluated in ambient and heat cured surface coating applications resulted in coating films with good appearance, satisfactory resistance properties comparable to formulations using amino-formaldehyde resins as crosslinkers and superior formulation stability.

Example 7

Mixed Methyl and Ethyl Ether of 2-Imidazolidinone-Ethanedial Resin

The procedure of Example 1 was repeated by reacting 1 mol of glyoxal with 1 mol of ethylene urea hemihydrate, and then alkylating using methanol as the first alcohol and ethanol as the second alcohol. The resulting product solution was filtered. The product was a clear viscous resin with a mass fraction of solids of about 76%.

The degree of etherification was determined by $^{13}C$-NMR as n(—O-Alkyl)/n(EU)=1.83 mol/mol, and the molar mass was determined by HPSEC as $M_w$=1506 g/mol. The ratio of the amount of substance of ethoxy groups to the amount of substance of methoxy groups in the reaction products was 7 mol/mol. As with product of Example 1, this mixed ether product of example 7 when evaluated in ambient and heat cured surface coating applications resulted in coating films with good appearance, satisfactory resistance properties comparable to formulations using amino-formaldehyde resins as crosslinkers and superior formulation stability.

Example 8

Ethyl Ether of 2-Imidazolidinone-Ethanedial Resin

A monoether resin according to the invention was prepared by the following procedure: The procedure of Example 1 was repeated by reacting 1.18 mol of glyoxal with 1 mol of ethylene urea hemihydrate, and alkylating using ethanol as the first alcohol and ethanol as the second alcohol. The resulting product solution was filtered.

The product was a clear viscous resin with a mass fraction of solids of 62%. The degree of etherification was determined by $^{13}$C-NMR as n(—O-Alkyl)/n(EU)=1.87 mol/mol; and the molar mass by HPSEC as $M_w$=1920 g/mol. As with the product of Example 1, this mono ether product of example 8 when evaluated in ambient and heat cured surface coating applications resulted in coating films with good appearance, satisfactory resistance properties comparable to formulations using amino-formaldehyde resins as crosslinkers and superior formulation stability. It was further demonstrated that this product can be used as crosslinker with waterborne acrylic polymer resulting in coatings with good appearance and satisfactory performance.

The products exemplified in examples 1, 5, 6, 7 and 8 use the hemihydrate as solid form of ethylene urea. Our investigations have shown that the initial reaction product of glyoxal with ethylene urea can be made, isolated and stored at ambient or sub-ambient temperatures for three to four weeks prior to use in the etherification steps. Optionally this intermediate can be dried to increase the mass fraction of solids from approximately 40% to up to 100%, and the semi-dry to solid product can be subsequently used in the etherification steps. Our investigations have further shown that a liquid form of ethylene urea can also be effectively used in this process. Aqueous solutions of ethylene urea hemihydrate having a mass fraction of solids of from 10% to 60% can also be used according to the process of this invention. It has been found that when using purified cyclic ureas, particularly ethylene urea with very low levels of alkaline impurities, the colour of the reaction product with multifunctional aldehydes are improved. Purification can be done by the usual processes such as recrystallisation, melt crystallisation, extraction, distillation or sublimation, complexation, adsorption or ion-exchanging the impurities from an aqueous solution.

Example 9

Preparation of Coating Compositions

Coating compositions were prepared by using the ingredients listed in table 3 infra. The short oil alkyd based on coconut oil was charged to a vessel, fitted with a suitable mixing device, followed by addition of the solvent and requisite level of catalyst (pTSA in isopropanol or DNNDSA in isobutanol). The crosslinkers of examples 5 to 7 were added along with additional solvent as needed and stirred to provide a coating formulation with a mass fraction of solids of 50% (9.1, crosslinker of Example 5) and of 45% (9.2 and 9.3, crosslinkers of Examples 6 and 7) and an overall mass ratio of binder to crosslinker of 70/30.

TABLE 3

| Coating Compositions | | | |
|---|---|---|---|
| coating composition | 9.1 | 9.2 | 9.3 |
| crosslinker of example | 5 | 6 | 7 |
| mass of crosslinker in g | 21.3 | 21.7 | 17.8 |
| mass of binder resin[1] in g | 58.1 | 52.5 | 52.5 |
| mass of solvent[2] in g | 0.1 | 0.9 | 0.9 |
| mass of catalyst solution[3] in g | 2.7[31] | 0.9[32] | 2.3[31] |
| mass of 1-butanol in g | 10.8 | 9.1 | 9.1 |
| mass of ethanol in g | 7.0 | 0 | 17.4 |
| mass of butyl acetate in g | 0 | 14.9 | 0 |

[1]short oil coconut alkyd resin, Beckosol ® 12-035, Reichhold Industries, Inc.
[2]solvent is methoxy propanol
[3]catalyst is:
[31]pTSA or
[32]DDNDSA, each 40% strength in solution as explained supra, Films were prepared by applying the coating composition of Examples 9.1 to 9.3 to the surface of 101.6 mm×152.4 mm (4"×6") clean glass panels and to "ED 6060" electrodeposition-primed steel panels using a wire-wound coating bar #65 to drawdown the applied formulation resulting in a uniform film. The coated panels were then allowed to flash at room temperature for twenty-four hours at ambient conditions (20° C.) in the first series, or were cured, for the second series, for five minutes at 65° C., and film properties measured twenty-four hours later. Film appearance was judged visually, where coating films denoted with "poor" had irregular surface, and coating film denoted with "good" had smooth transparent surface and no wrinkles. Film hardness was measured using BYK Gardner Pendulum Hardness Tester—König hardness, measured according to ASTM D 4366, and its MEK (methyl ethyl ketone) resistance by number of double rubs to mar and to failure (removal of more than 50% of the coating film), the test being stopped at 200 double rubs. The results listed in table 4 were obtained:

TABLE 4

| Coating Performance | | | |
|---|---|---|---|
| Coating Composition | 9.1 | 9.2 | 9.3 |
| crosslinker of example | 5 | 6 | 7 |
| ambient temperature cure | | | |
| substrate | ED 6060 | Glass | ED 6060 |
| film appearance | good | good | good |
| hardness after 24 h in s | 112 | 95 | not measured |
| cured at 65° C. for five minutes | | | |
| substrate | ED 6060 | Glass | ED 6060 |
| hardness after 24 h in s | 123 | not measured | 143 |
| MEK resistance | 200 | not measured | 200 |
| formulation stability | >48 h | >48 h | >48 h |

Example 10

Properties of Water-Borne Coating Compositions

A clear film-forming composition using a water-borne acrylic resin dispersion (RoShield® 1024 from The DOW Chemical Company, aqueously dispersed acrylic resin having a mass fraction of solids of 50% with a hydroxyl number of 41 mg/g and an acid number of 10 mg/g) was prepared by mixing together the following ingredients: 21.9 g of the crosslinker solution of example 8 having a mass fraction of solids of 62% was added to 63 g of the acrylic dispersion and mixed. Then 0.9 g of methoxy propanol was added to the mixture of acrylic resin and crosslinker and stirred well. Finally, 4.5 g of the 40% strength pTSA-solution isopropanol and 9.7 g of water were added and mixed to provide a clear coating formulation with a mass fraction of solids of 45% and a ratio of the mass of acrylic resin to the mass of crosslinker of 70/30.

Films were prepared by applying the coating formulation thus prepared to the surface of a 76.2 mm×152.4 mm (3"×6") glass panel for hardness test and MEK resistance test using a #52 wire-wound coating bar to drawdown the applied coating formulation resulting in a uniform film. The coated panel was then allowed to flash at room temperature for fifteen minutes. The coatings were allowed to cure in the first series for twenty-four hours at ambient conditions (20° C.), and in the second series, were cured for five minutes at 65° C., and measured 24 hours later. Film hardness was measured using BYK Gardner Pendulum Hardness Tester as König hardness, measured according to ASTM D 4366, and its MEK resistance by number of double rubs to mar and to failure (removal of more 50% of the coating layer), the test being stopped at 200 double rubs.

The following results were found:

for ambient cure, the dry film thickness was 46 im (0.0018 inch); the König hardness was 96 s, and the MEK resistance was 200 double rubs. For cure at 65° C. for five minutes, the dry film thickness was 46 im (0.0018 inch), the Konig hardness was 104 s, and the MEK resistance was 165 double rubs. In both cases, the coating film was even and glossy and did not show surface defects.

Example 11

Mixed Methyl and Butyl Ether of 2-Imidazolidinone-Ethanedial Resin Using Aqueous Ethylene Urea Solution A resin according to the invention was prepared by the following procedure:

363 g (2.6 mol) of an aqueous solution of glyoxal (ethane dial, with a mass fraction of solute of 40%) were charged to a reaction vessel under a nitrogen purge and the pH was adjusted to 6.2 with aqueous sodium bicarbonate solution with a mass fraction of solids of 10%. 518 g (2.1 mol) of an aqueous solution of ethylene urea hemihydrate (with a mass fraction of solute of 40%) were added and the resulting mixture was heated to a temperature of between 40° C. and 45° C. and held for three hours under stirring. At the end of three hours, 464 g (14.5 mol) of methanol were added. The pH was adjusted to 2.5 with aqueous sulphuric acid (with a mass fraction of solute of 25%) and the reaction temperature was then raised and maintained at (48±3)° C. for three hours. At the end of three hours of methylation, 998 g (13.5 mol) of 1-butanol were added and pH was readjusted to about 2.5 with aqueous sulphuric acid as supra. The reaction temperature was again maintained at (48±3)° C. for one hour and then, excess methanol and butanol were removed slowly under reduced pressure (25.333 kPa slowly linearly decreased to 16 kPa, equivalent to 190 mm Hg ramped to 120 mm Hg) until a mass fraction of 38% of the total reaction mass had been removed. The remaining reaction mixture was then cooled to 35° C. and the pH of the reaction mixture was then adjusted to approximately 6.5 with aqueous sodium hydroxide solution having a mass fraction of solids of 25%. The reaction temperature was then raised (55±5)° C. and removal of excess methanol and butanol was continued under reduced pressure (16 kPa slowly linearly decreased to 6.7 kPa, equivalent to 120 mm Hg ramped to 50 mm Hg) until a mass fraction of solids of 60% was obtained. The resulting product solution was filtered.

The resulting resin had a viscosity according to Gardner-Holt designated as "L", equivalent to 300 mPa·s, the degree of etherification measured by $^{13}$C-NMR was n(OR)/n(EU) =1.86 mol/mol, the amount-of-substance ratio of butoxy to methoxy groups was n(OBu)/n(OMe)=5.6 mol/mol, and the weight average molar mass as determined by HPSEC was 2427 g/mol.

In another embodiment of this invention it was surprisingly found that the when the glyoxal charge was split the reaction with ethylene urea proceeded smoothly resulting in the formation of a non-etherified product of higher molar mass and a different molar mass distribution. Thus the second aspect of our invention deals with preparation of etherified ethylene urea-glyoxal condensed resin by reacting ethylene urea with glyoxal added in two distinct stages. This is exemplified by example 12.

Example 12

Mixed Methyl and Butyl Ether of 2-Imidazolidinone-Ethanedial Resin by Split Glyoxal Addition (GO:EU=1.1:1 Charged as (0.8+0.3):1.0)

A resin according to the invention was prepared by the following procedure: 197.2 g (1.36 mol) of an aqueous solution of glyoxal (ethane dial, with a mass fraction of solute of 40%) were charged to a reaction vessel under a nitrogen purge and the pH was adjusted to 6.5 by addition of aqueous sodium bicarbonate solution with a mass fraction of solids of 10%. 161.5 g (1.7 mol) of ethylene urea hemihydrate (95.1 g/mol, 2-imidazolidinone, solid) were added at ambient temperature over a period of fifty-two minutes. The reaction mixture was heated to 25° C. and a mild exotherm to 37° C. was observed along with a pH increase of 0.8. The temperature was raised to 45° C. and held for one to three hours. The heating was turned off and the reaction mixture was allowed to cool to ambient for four hours. 93 g (0.64 mol) of an aqueous solution of glyoxal (ethane dial, with a mass fraction of solute of 40%) was slowly charged to the flask while monitoring pH. The pH was adjusted to 6.5 by addition of aqueous sodium bicarbonate solution with a mass fraction of solids of 10%. A mild exotherm to 35° C. was observed. The temperature was maintained at 35° C. for one hour. The heating was then turned off and the reaction mixture allowed to cool to ambient for four hours. The resulting product solution was filtered. A straw yellow solution of the non-etherified addition product was isolated having a dynamic viscosity of approximately 820 mPa·s and a mass fraction of solids of 57.8%. The weight-average molar mass $M_w$ was found to be 1281 g/mol.

185.6 g of above non-etherified product with a mass fraction of solute of 57.8% were charged to a reaction vessel under a nitrogen purge. 159 g (4.96 mol) of methanol were added. The pH was adjusted to about 2.5 by addition of aqueous sulphuric acid having a mass fraction of solute of 25%) and the reaction temperature was then raised and maintained at (48±3)° C. for two hours. At the end of two hours of methylation, 307 g (4.15 mol) of 1-butanol were added and pH was readjusted to about 2.8 by addition of aqueous sulphuric acid (as supra). The reaction temperature was again maintained at (48±3)° C. for two hour and then, excess methanol and butanol were removed slowly under reduced pressure (25.333 kPa slowly linearly decreased to 16 kPa, equivalent to 190 mm Hg ramped to 120 mm Hg) until a mass fraction of approximately from 38% of the total reaction mass had been removed. The remaining reaction mixture was then cooled to 35° C. and the pH of the reaction mixture was then adjusted to 6.5 by addition of aqueous sodium hydroxide solution having a mass fraction of solids of 25%. The reaction temperature was then raised (55±5)° C. and removal of excess methanol and butanol was continued under reduced pressure (16 kPa slowly linearly decreased to 6.7 kPa, equivalent to 120 mm Hg ramped to 50 mm Hg) until a dynamic viscosity of approximately 230 mPa·s and a mass fraction of solids of 60% were obtained. The resulting product solution was filtered.

The degree of etherification of the resulting straw yellow crosslinker solution (240 g) were determined by $^{13}$C-NMR as n(—O-Alkyl)/n(EU)=2.26 mol/mol; and the molar mass was measured by HPSEC as $M_w$=1660 g/mol. The fraction of the area in the graph of refraction number difference versus elution volume commonly provided in a high performance size exclusion analysis (also referred to as gel permeation chromatography) of the low molar mass range (below a molar mass of 1 kg/mol) was 32%. The ratio of the amount of substance of n-butoxy groups to the amount of substance of methoxy groups in the reaction products was 1.73 mol/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

In another embodiment of the invention, the crosslinkers of this invention were found to provide effective cure at elevated temperatures (150° C. or higher) useful in high temperature surface coating applications.

Example 13

Preparation of Pigmented Coating Compositions

Coating compositions were prepared as follows: 244 g of TiO$_2$ pigment were added to 329 g of a solvent-borne acrylic resin, VIACRYL® SC 303/65 XB having an acid number of 12 mg/g and a hydroxyl number of 80 mg/g, and dispersed in a Cowles blade mixer at 2000 min$^{-1}$ until a particle size of less than 25 im (Hegman grind number of at least 6) was achieved. The resulting mixture was diluted with 61 g of 1-butanol and 80 g of isopropanol, and 15 g of a catalyst solution were added, comprising the diisopropanolamine salt of para-toluene sulphonic acid, dissolved in ethylene glycol, having a mass fraction of solute 35%, followed by 12 g of methoxy propanol . Then, 146 g of the crosslinker solution of example 1 were added to the pigmented solvent-borne acrylic resin, followed by 113 g of solvent methoxy propanol acetate to provide a coating formulation with a mass fraction of solids of 55% and an overall mass ratio of binder to crosslinker of 70/30. The ratio of the mass of pigment to the mass of binder in this coating composition 13.1 was 0.8.

Pigmented formulations were also made with a highly methylated melamine-formaldehyde crosslinker resin (coating composition 13.3, 165 g of methoxypropanol acetate, 94 g of crosslinker resin, ratio of the amount of substance $n_{MeO}$ of methoxy groups to the amount of substance $n_F$ of groups derived form formaldehyde to the amount of substance $n_M$ of melamine-derived moieties is 5.0:5:8:1, mass fraction of monomeric material is 59%). Films were prepared by applying the coating composition of Examples 13.1 and 13.3 to the surface of Bonderite® 1000 cold rolled steel sheet panels using a wire-wound coating bar #40 to drawdown the applied formulation resulting in a uniform film. The coated panels were then cured for fifteen minutes at either 95° C., and 150° C., respectively, and film properties were measured twenty-four hours later. Film hardness was measured using a BYK Gardner Pendulum Hardness Tester, and MEK resistance was determined by the number of double rubs to mar and to failure (removal of more than 50% of the coating film), the test being stopped at two hundred double rubs.

The following table 5 lists the data measured on coating compositions 13.1 and 13.3:

TABLE 5

| Application Data | | | |
|---|---|---|---|
| Curing | Coating composition | 13.1 | 13.3 |
| 150° C., 15 min | Dry Film Thickness in im | 21.1 | 19.8 |
| | Indentation Hardness $^1$ in J (in × lb) | 2.41 (21.3) | 2.40 (21.2) |
| | Solvent Resistance | >200 | >200 |
| | Pendulum Hardness $^5$ in s | 154 | 162 |
| 95° C., 15 min | Dry Film Thickness in im | 21.3 | 21.6 |
| | Indentation Hardness $^1$ in J (in × lb) | 1.40 (12.4) | 1.41 (12.5) |
| | Solvent Resistance $^4$ | >200 | >200 |
| | Pendulum Hardness $^5$ in s | 134 | 131 |

$^1$ measured according to ASTM D 1474, method A: "Knoop Hardness Number", values in J and (in × lb)
$^4$ MEK double rubs until failure, maximum number 200; ">200" means: no damage at two hundred double rubs
$^5$ pendulum hardness according to König, ASTM D 4366

It can be seen from these data that crosslinking with the crosslinker according to the invention (Coating composition 13.1) is on par with commercially accepted systems (melamine-formaldehyde resin crosslinker, 13.3).

What is claimed is:

1. A reaction product UA of at least one cyclic urea U and at least one multifunctional aldehyde A which reaction product has as substituents on the carbonyl carbon atoms of the aldehyde A at least one kind of functional groups selected from the group consisting of hydroxyl groups —OH and alkoxy groups —OR characterized in that the groups —OR comprise alkoxy groups —OR1 and —OR2, where R1 and R2 are both selected from the group consisting of linear, branched or cyclic alkyl groups having from one to twelve carbon atoms, which may be interrupted by one or more of —O—, —NR"—, —S—, where R" stands for H, or an alkyl group having from one to six carbon atoms, with the proviso that not two —O—or not two —S—atoms may be immediately adjacent, wherein
  R1 and R2 are different from each other, and R2 has at least one carbon atom more than R1, the reaction product UA being made by a process comprising the steps of
  a) mixing a multifunctional aldehyde A with a cyclic urea U to effect an addition reaction, optionally, in the presence of a co-solvent which does not react with any of the multifunctional aldehyde A, the cyclic urea U, and the reaction product UA,
  b) adding an aliphatic alcohol R1 —OH, and etherifying under acid conditions
  c) further etherifying under acid conditions with an added aliphatic alcohol R2 —OH which has at least one carbon atom in its molecule more that there is in R1 —OH, wherein the etherification is conducted in a sequential manner involving at least 2 subsequent steps b) and c), and wherein the reaction product UA has a degree of etherification, measured as the ratio n(RO—) / n(U) of the amount of substance n(RO—) of alkoxy groups to the amount of substance n(U) of cyclic urea U chemically bound in the reaction products, of at least 1.1 mol/mol.

2. The reaction product UA of claim 1 wherein $R^1$ and $R^2$ are different from each other, and $R^2$ has at least one carbon atom more than $R^1$, and the ratio of the number of —OR groups to the sum of the number of —OH groups and the number of —OR groups which are substituents on the carbonyl carbon atoms of the aldehyde A in the reaction product UA is at least 50%, the number of —OR groups being the sum of the number of —$OR^1$ groups and the number of —$OR^2$ groups.

3. The reaction product UA of claim 1, wherein the ratio of the amount of substance of residual >NH groups to the amount of substance of moieties derived from the cyclic urea U is not more than 0.2 mol/mol.

4. The reaction product UA of claim 1 characterised in that the aldehyde A is glyoxal or a mixture comprising glyoxal.

5. The reaction product UA of claim 1 characterised in that the cyclic urea U is selected from the group consisting of ethylene urea, 1,3-propylene urea, 1,2-propylene urea, 1,4-butylene urea, glycoluril, or a mixture comprising at least two of these.

6. The reaction product UA of claim 5 characterised in that the cyclic urea U is purified before reaction with the multifunctional aldehyde A by one or more processes selected from the group consisting of recrystallisation, extraction, complexation, adsorption and ion exchange reactions, distillation, sublimation, and melt crystallisation.

7. A process to make a reaction product UA, comprising
a) mixing a multifunctional aldehyde A with a cyclic urea U to effect an addition reaction, optionally, in the presence of a co-solvent which does not react with any of the multifunctional aldehyde A, the cyclic urea U, and the reaction product UA, and further optionally, removing water,
b) after step a, adding an aliphatic alcohol R1 —OH, and etherifying under acid conditions, and
c) after step b, adding a further aliphatic alcohol R2—OH which has at least one carbon atom in its molecule more that there is in R1 —OH, and etherifying under acid conditions to obtain the reaction product UA,
wherein either or both of steps b) and c) may be repeated one or more times,
wherein R1 and R2 are different from each other,
wherein R2 has at least one carbon atom more than R1, and
wherein the reaction product UA has as substituents on the carbonyl carbon atoms of the aldehyde A at least one kind of functional groups selected from the group consisting of hydroxyl groups —OH and alkoxy groups —OR,
wherein the alkoxy groups —OR comprise alkoxy groups —OR1 and —OR2,
wherein R1 and R2 are both selected from the group consisting of linear, branched or cyclic alkyl groups having from one to twelve carbon atoms, which are optionally interrupted by one or more of —O—, —NR"—, —S—with the proviso that not two —O— or not two —S—atoms may be immediately adjacent,
wherein R" stands for H, or an alkyl group having from one to six carbon atoms.

8. The process of claim 7 wherein the ratio of the amount of substance n (—O—$R^2$) of alkoxy groups —O—$R^2$ to the amount of substance n (—O—$R^1$) of alkoxy groups —O—$R^1$ in the etherified product of the process of claim 7 is between 0.11 mol/mol and 20 mol/mol.

9. The process of claim 7 to make the reaction product UA,
where step c) is done at least twice.

10. The process of claim 7 characterised in that in step a), the amount of multifunctional aldehyde A added is between 20% and 80% of the stoichiometric amount needed, and that after step a), a further quantity of multifunctional aldehyde A is added and reacted with the reaction mixture formed in step a) wherein the total amount of multifunctional aldehyde A added is chosen such that the ratio of the amount of substance of aldehyde groups n(—CHO) in the multifunctional aldehyde A and the amount of substance of amide groups n(—CO—NH—) in the cyclic urea U is from 0.8 mol/mol to 1.4 mol/mol.

11. The process of claim 7 characterised in that the mixture of cyclic urea U, multifunctional aldehyde, and optionally, water or solvent, is concentrated before or during the reaction by removing volatile constituents by distillation, or distillation under reduced pressure.

12. The process of claim 7 characterised in that during or after step a) and/or during or after step b), at least a part of the unreacted alcohol $R_1OH$ and/or water is removed by distillation.

13. A method of use of the reaction product UA of claim 1 as crosslinker, comprising admixing the said reaction product UA to a binder resin having at least one of hydroxyl groups, acid groups, preferably carboxyl groups, carbamate groups, amide groups, imide groups, amino groups, imino groups, mercaptan groups, or phosphine groups, homogenising, and applying the homogenised mixture to a substrate by spraying, brushing, wire coating, curtain coating, blade coating, roll coating, dipping, electrophoretic deposition, powder spraying, or electrostatic spraying.

14. The method of claim 13, characterised in that at least one of water, an organic solvent, a catalyst, a pigment, a filler, a light stabiliser, a coalescing agent, a defoamer, a wetting agent, a levelling agent, a wetting agent, a thickening agent, an antisettling agent, an antiskinning agent, and a preservative, is added to the mixture of the reaction product UA and the binder resin.

15. The method of use of claim 13, characterised in that the substrate is selected from the group consisting of plastics including thermoplastics and thermosets, wood, ceramics and glass, fabricated wood, leather, textiles, tyre cord, rubber objects, paper, cardboard, plaster, concrete, and metal, metallised circuit boards, semiconductor surfaces, displays, and packagings for electronic circuitry.

16. A method of use of the reaction product UA of claim 1 as crosslinker for substrates selected from the group consisting of paper, textiles, wood, fabricated wood, leather, or cellulosic materials, comprising mixing at least one of catalysts, fillers, wetting agents, solvents, and diluents, to the reaction product UA to form a crosslinker composition, and applying the crosslinker composition to the substrate.

17. A mixture comprising the reaction product UA of claim 1 and at least one binder resin, each of which having at least one of hydroxy functional groups, carbamate functional groups, acid functional groups, amide functional groups, imide functional groups, amino functional groups, imino functional groups, mercaptan functional groups, or phosphine functional groups.

18. The reaction product UA of claim 1, wherein $R_1$—OH is water-miscible.

19. The reaction product UA of claim 1, wherein $R_2$—OH has limited solubility in water.

20. The reaction product UA of claim 1, wherein $R_2$—OH has at least 4 carbon atoms.

21. The reaction product UA of claim 1, wherein during or after step a) and/or during or after step b) at least a part of unreacted alcohol $R_1$—OH and/or water is removed.

22. The reaction product UA of claim 1 characterised in that the aliphatic alcohol $R^2$—OH is ethanol and/or n-butanol.

23. The reaction product UA of claim 7 characterised in that the aliphatic alcohol $R^1$—OH is methanol.

24. The reaction product UA of claim 1, wherein the at least one cyclic urea U is ethylene urea, the at least one multifunctional aldehyde A is glyoxal, the aliphatic alcohol $R^1$—OH is methanol and wherein the aliphatic alcohol $R^2$—OH is n-butanol and/or ethanol.

* * * * *